United States Patent Office 3,182,160
Patented May 4, 1965

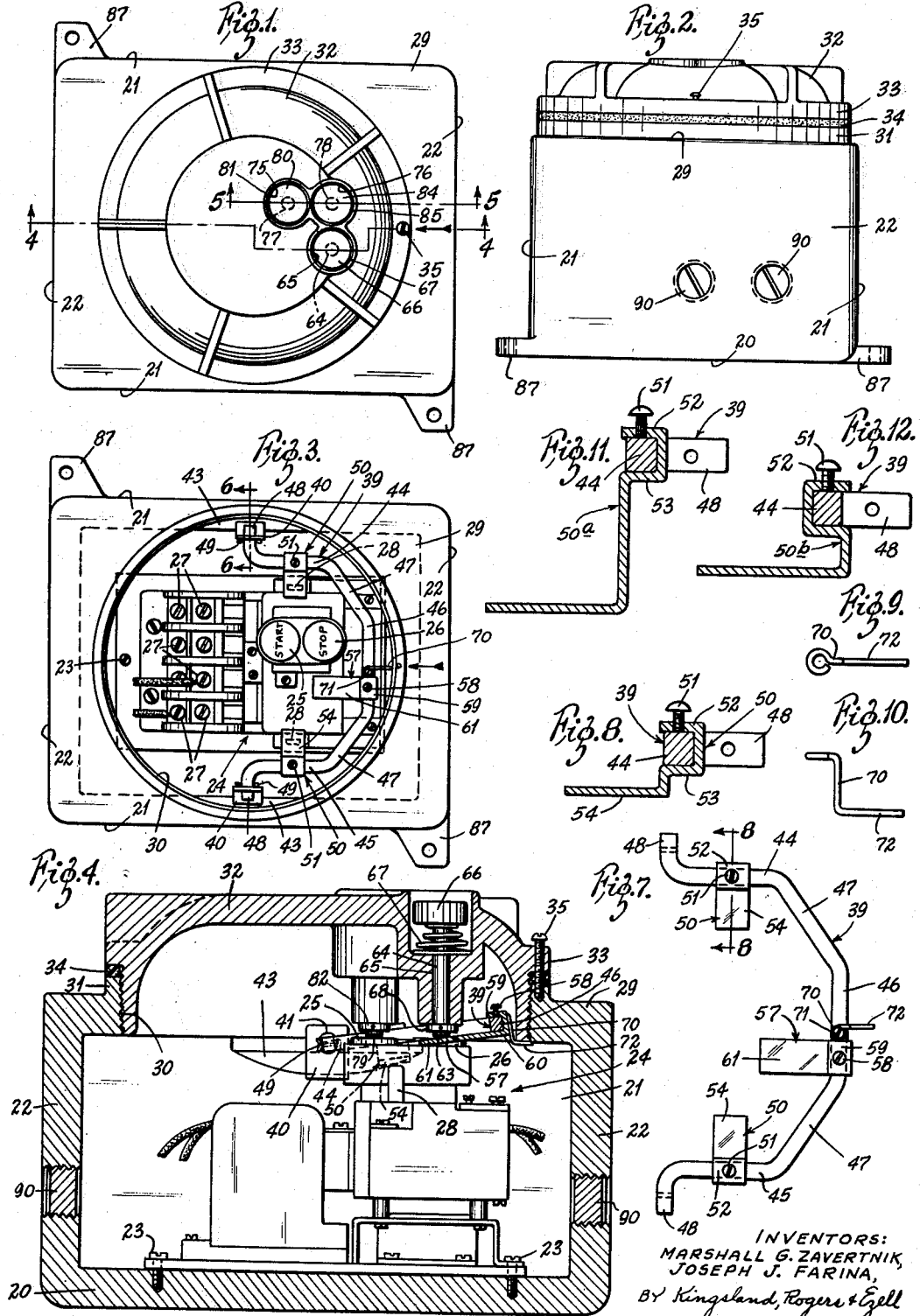

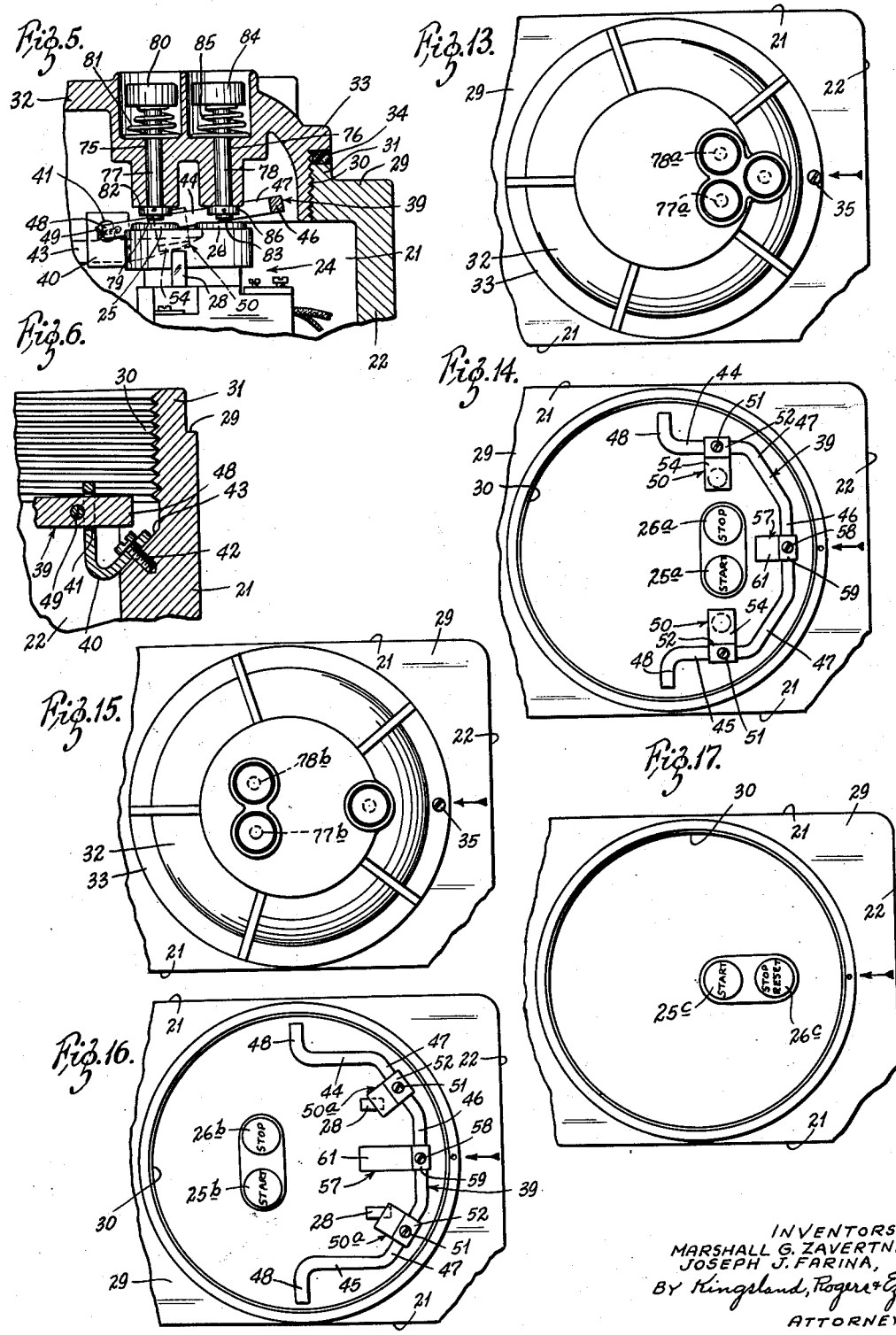

3,182,160
UNIVERSAL JUNCTION BOX FOR HOUSING DIFFERENT TYPES OF ELECTRICAL APPARATUS
Marshall G. Zavertnik, St. Louis, and Joseph J. Farina, Richmond Heights, Mo., assignors to Killark Electric Manufacturing Company, St. Louis, Mo., a corporation of Missouri
Filed Apr. 24, 1961, Ser. No. 105,119
10 Claims. (Cl. 200—168)

This invention relates to a universal junction box, and particularly to a junction box for housing any one of the various different types of motor starters, although the box may be used to house similar electrical apparatus.

In general, the junction box includes a box for housing a motor starter of the type having one or more of a start, stop, and reset buttons. The junction box has a removable cover that accommodates various trip rods for operating the start, stop and reset buttons. The junction box also has a loop operator and lever combination that can be easily modified to provide operation of the various types and positions of reset buttons on the different motor starters.

A principal object of the invention is to provide a universal junction box that can house any of a plurality of different motor starters and that is easily and inexpensively adaptable to operate any one of the different motor starters.

Another important object of the invention is to provide a universal junction box that has all of the starter actuating elements operable through the cover of the box.

Yet another object of the invention is to provide a universal junction box that has no linkages extending through the sides of the box so that the box can be butt mounted adjacent similar junction boxes, or adjacent a wall.

Yet another object of the invention is to provide a universal junction box wherein all of the wire terminals are accessible without removal of the motor starter from the box.

Yet another object of the invention is to provide a universal junction box having various levers for adapting the box to operate any motor starter, wherein the levers are removable for substitution by different levers, and wherein the means for removing the levers accessible from the top of the junction box, and another object is to provide such levers for operating more than one starter reset button, in combination with only a single trip rod on the junction box for operating all the reset levers.

Yet another object of the invention is to provide a junction box having various removable levers with means in the design of the levers for withstanding the thrust forces of operation.

Another object of the invention is to provide a universal junction box, the construction of which incorporates all the requirements of electrical codes, such as flame path tolerance, thickness of walls and minimum gap between the terminals of the starter and ony conductive parts of the junction box, so that the electrical devices may be operated in areas containing moisture (rain, water corrosion liquids and/or vapors), explosive gases or liquids, explosive dusts, non-explosive dusts, or any combination of these conditions.

Other objects of the invention are to provide a universal junction box for motor starters that is inexpensive to manufacture, that can be readily modified by the substitution of inexpensive parts, and that can be easily assembled (by untrained personnel).

In the drawings:
FIGURE 1 is a plan view of the junction box with one type of cover to accommodate a particular starter;
FIGURE 2 is a side elevation view of the junction box taken from the right side of FIGURE 1;
FIGURE 3 is a plan view of the junction box with the cover removed;
FIGURE 4 is a view in section on an enlarged scale, taken along the line 4—4 of FIGURE 1;
FIGURE 5 is a view in section on an enlarged scale, taken along the line 5—5 of FIGURE 1;
FIGURE 6 is a view in section on an enlarged scale, taken along the line 6—6 of FIGURE 3;
FIGURE 7 is a plan view on an enlarged scale of the operator lever;
FIGURE 8 is a view in section on an enlarged scale, taken along the line 8—8 of FIGURE 7;
FIGURE 9 is a plan view of a safety spring;
FIGURE 10 is a side elevation view of the safety spring of FIGURE 9;
FIGURE 11 is a view in section similar to FIGURE 8, but showing a different form of trip lever;
FIGURE 12 is a view in section similar to FIGURE 8, but showing still another form of trip lever;
FIGURE 13 is a partial plan view of the junction box with a different cover for accommodating a different starter;
FIGURE 14 is a partial plan view of the junction box of FIGURE 13, but with the cover removed;
FIGURE 15 is a partial plan view of the junction box with still a different cover for accommodating another starter;
FIGURE 16 is a partial plan view of the junction box of FIGURE 15, but with the cover removed; and
FIGURE 17 is a partial plan view of the junction box with still another type of starter, the junction box cover being removed.

This junction box is especially designed for universal use to house any of the several different motor starters that are presently available. Also, its design is such that the junction box may be readily adapted for use with additional motor starters which might become available.

The junction box includes a housing having a bottom 20, a pair of side walls 21 and a pair of end walls 22. The bottom 20 has a plurality of tapped holes for receiving some screws 23 that mount a motor starter 24.

The starter 24 is illustrative of one type, having, in common with other starters, a start button 25, a stop button 26, and a plurality of terminal posts 27. The starter housed in the junction box of FIGURES 3 and 4 has a pair of reset buttons 28 on opposite sides of the starter. All of these buttons are spring biased in an upward direction. Other starters may have either one or two reset buttons located at different positions on the starter. Also, the positions of the start and stop buttons vary with different starters. However, all the start, stop, and reset buttons are operable upon being depressed in a downward direction, as viewed in FIGURE 4.

The junction box has a top 29 with a large, internally threaded opening 30, partly defined by an upwardly extending annular shoulder 31, and through which the motor starter can fit for mounting. There is a round cover 32 threaded into the opening 31, the cover being of generally concave shape, as illustrated in FIGURE 4. The cover has an annular flange 33 that presses a gasket 34 against the top of the shoulder 31 when the cover is tightened. The cover is locked against rotation by a long screw 35.

In order for the junction box to have the universal utility with the various types of starter boxes, it has an arrangement of actuators that can be varied in position according to the positions of the start, stop and reset buttons on a starter. Some of these actuators merely require adjustment, and others involve a substitution of inexpensive parts.

The reset buttons are controlled by a loop operator 39 that is pivotally supported between two loop brackets 40 having holes 41 for receiving the ends of the loop operator. The loop brackets 40 are fastened by screws 42 to sloping portions 43 of the side walls 21 immediately beneath the opening 30. Therefore, the screws 42 are accessible to a screw driver extended through the opening 30. The loop operator is rectangular in cross section to prevent rotation about it of a plurality of levers to be described, and has the general plan shape illustrated in FIGURE 7, with a pair of straight side sections 44 and 45, and a straight end section 46 spaced from the side sections by a pair of angled sections 47. The opposite ends of the side sections 44 and 45 have lateral extensions 48 for fitting into the holes 41 of the loop brackets 40, and the extensions are held within the holes 41 by cotter pins 49.

There are a pair of trip levers 50 attached by set screws 51 to the side sections 44 and 45 of the loop operator 39. The trip levers 50 are bent about the loop operator 39 so that a portion 52 through which the set screw 51 is threaded, overlies the loop operator and another portion 53 underlies the loop operator. Hence, the set screw is accessible through the opening 30 to permit replacement or sliding of each trip lever 50. At the same time, the overlying and underlying portions 52 and 53 absorb the pressures of operation, as will be described. Each trip lever 50 also has an actuator extension 54 that is directly above a reset button 28 so that when the loop operator is depressed, the actuator extensions 54 will depress the reset buttons.

While the spring biased reset buttons 28 normally bias the loop operator 39 to the position shown in FIGURE 4, the loop operator can be depressed or pivoted about the brackets 40 to operate the reset buttons. To pivot the loop operator, there is a depression lever 57 attached by a set screw 58 to the end section 46 of the loop operator. The depression lever 57 is bent to provide upper and lower clamping portions 59 and 60, respectively, that cooperate with the set screw 58 to lock the depression lever 57 to the loop operator 39. The lower clamping portion 60 is extended to provide a trip rod engaging portion 61. The set screw 58 is accessible from the opening 30. Its position is such that even when the loop operator 39 is depressed by the trip rod 64, a minimum gap of at least one-half inch is maintained between the loop operator 39 or its lever 50 and any terminal port 27.

The trip rod engaging portion 61 of the depression lever 57 is engageable by the lower end 63 of a trip rod 64. There is a countersunk hole 65 through the cover 32 for receiving and guiding the trip rod 64. The trip rod 64 has a finger button 66 at its upper end that fits within the larger upper portion of the countersunk hole 65 and the trip rod 64 is biased upwardly by a compression spring 67. A ring 68 is fixed to the lower end of the pin 64 to limit its upward movement.

It is apparent that the reset buttons are operated upon depression of the finger button 66, whereby the trip rod 64 presses against the trip rod engaging portion 61 of the operating lever 57 and pivots the operating lever downwardly (as viewed in FIGURE 4), the pressure of the trip levers 50 against the reset buttons 28 causing the buttons to be depressed. As soon as the finger button 66 is released, it is re-extended under the force of the spring 67, and the loop operator 39 is raised by the upwardly biased reset buttons.

The counterclockwise pivoting movement of the loop operator 39 is limited by a wire spring 70 that is attached by a screw 71 to the straight end portion 46 of the loop operator, with its free end 72 bent to engage the lower surface of the top 29 of the junction box.

The cover 32 of the junction box has two additional countersunk holes 75 and 76 for receiving a start button trip rod 77 and a stop button trip rod 78, respectively. When the cover 32 is in place on the junction box, these holes 75 and 76 are positioned so that the trip rods 77 and 78 are directly above the start and stop buttons 25 and 26.

The start button trip rod 77 has a lower end 79 for depressing the start button 25, a finger button 80 at its upper end. There is a compression spring 81 surrounding the trip rod 77 for biasing the trip rod in an upward direction, and a ring 82 attached adjacent the lower end of the trip rod for limiting its upward movement. Correspondingly, the stop button trip rod 78 has a lower end 83, a finger button 84, a compression spring 85, and a limiting ring 86.

It is now apparent that the start, stop and reset buttons 25, 26 and 28 can be operated from outside the junction box by simply depressing one of the several finger buttons 80, 84, or 66.

The junction box has a pair of lugs 87 extending laterally from the side walls 21 so that it can be fastened to a wall. These lugs 21 may depend from the end walls 22 instead of the side walls. The junction box may be mounted with either side 21 or either end 22 disposed in an upward direction because, regardless of the position of the junction box, the wire spring stop 70 prevents the loop operator 39 from flipping over into a position of interference with the rotation of the cover 32. Consequently, the cover 32 may be removed while the junction box is vertically mounted to allow servicing or replacement of the starter within the junction box.

The configuration and position of the loop operator 39 has special significance to the invention. First of all, the loop operator is bent so that every part of it lies outside the radial distance of the several trip rods 64, 77 and 78 and of the sleeve extensions that define the countersunk holes 65, 75 and 76 through which these trip rods project. Therefore, the cover 32 can be rotated, carrying with it the trip rods, without interference from the loop operator 39. Also, as mentioned, the wire spring stop 72 limits the counterclockwise rotation of the loop operator 29 so that it cannot extend beyond the position illustrated in FIGURE 4. Therefore, even when the junction box is mounted with the lugs 87 attached to a vertical wall, the loop operator will not interfere with the rotation of the cover 22.

To provide for motor starters having variously positioned reset buttons 28, the reset trip levers 50 can be adjusted along the loop operator 39 by merely loosening the set screws 51. In addition, there are motor starters that have reset buttons at different elevations than what is illustrated in FIGURE 8. FIGURES 11 and 12 illustrate examples of two additional forms of reset button trip levers 50a and 50b, respectively, each of which extends downwardly from the loop operator 39 by different amounts. It should be noted that, as illustrated in FIGURE 12, the reset button trip lever 50b may be wrapped about the loop operator 39 in an opposite direction compared to the reset button trip lever 50a. Also, as illustrated in FIGURE 16, the reset button trip levers 50a and 50b may be placed upon a different straight portion 47 of the loop operator 39, according to the position of the reset button 28.

FIGURES 14 and 16 also illustrate different starters having differently positioned start and stop buttons. These buttons are given the subscripts a and b, respectively in the two figures. The motor starters of these figures are illustrative of the several different types of motor starters in which the positions of the start and stop buttons are not uniform. For each of these different starters, this junction box is provided with a different cover 32 to provide different positions for the start and stop button trip rods. For example, the junction box of FIGURE 13 is provided with a cover 32 having the trip rods 77a and 78a positioned immediately above the start and stop buttons 25a and 26a, respectively, of FIGURE 14. Likewise, the start and stop button trip rods 77b and 78b of FIGURE 15 corresponds in position to the start and stop buttons 25b and 26b of FIGURE 16.

FIGURE 17 illustrates a motor starter that has a start button 25c and a stop button 26c that also operates as a reset button. The junction box for this starter does not use any reset button trip levers 50. Instead, the cover 32 is designed with only two trip rods, one for depressing the start button 25c and the other for depressing the stop reset button 26c.

From the foregoing, it can be seen that the junction box of this invention is extremely versatile in being adaptable to all of the starter arrangements that it might operate. In many cases, the only change that need be made for adapting the junction box to different starters is the sliding of the reset button trip lever 50 along the loop operator 39. In other cases, a different set of trip levers 50a or 50b or other sets not illustrated, might be substituted, or there might be a substitution of the cover 32.

Another important advantage of the junction box is that it is easy to install a starter motor within the box and to assemble the various parts of the junction box. Assuming, for example, that the junction box is mounted to a vertical wall and the loop operator 39 is removed from the junction box, a motor starter 24 can be passed through the opening 30 in the top 29 of the junction box and attached by screws 23 to the bottom 20 of the junction box. These screws 23 are accessible through the opening 30. Next, electrically conductive wires may be attached to the terminals 27. For this, the junction box has a plurality of cap lugs 90 threaded into the ends 22 that can be replaced by wire conduits. (The threading into the junction box of these wire conduits permits the isolation of gases, etc., and has other advantages as are known in the art.)

The wires from these conduits can then be bound to the terminal posts 27 which also are accessible through the opening 30 of the junction box. Therefore, all of the wiring to the motor starter can be done without removal of the starter from the junction box.

The operating parts of the junction box are easily installed by first slipping the loop operator 39 into the bracket 40 and fastening the cotter pins 49. Next, the wire spring stop 70 may be screwed to the operator. Then, the trip levers 50, as required for the particular starter, are placed about the loop operator 39 and are slid along the operator until the actuator portions 54 overlie the reset buttons 28. Then the setscrews 51 are tightened. Finally, the lever 61 is positioned beneath the lower end 63 of the trip rod 64, and the proper cover 32 is tightened onto the junction box.

In this junction box, all of the various start, stop and reset buttons are actuated through the cover 32. As a result, there are no operating linkages extending through the sides of the junction box, and the junction box may be butt mounted alongside another junction box. This permits second junction boxes to be more compactly mounted.

Various changes and modifications may be made within the process of this invention as will be readily apparent to those skilled in the art. Such changes and modifications are within the scope and teaching of this invention as defined by the claims appended hereto.

What is claimed is:

1. A universal junction box for housing electrical equipment having depressible operator buttons, the positions of which may be variable, comprising a member in the form of a partial loop pivotally supported by the sides of the housing, a plurality of levers adjustably positionable on the member according to the positions of the operator buttons, and means for pivoting the member to operate the operator buttons.

2. A universal junction box for containing different kinds of electrical equipment having differently positioned depressible start and stop buttons comprising a housing for the equipment, a plurality of removable covers for the housing, and a pair of rods extending through each cover, the rods of different covers being positioned opposite the buttons of different kinds of electrical equipment, the rods being selectively depressible to operate the start and stop buttons, each cover being replaceable by another cover having differently positioned rods upon changing the electrical equipment within the housing.

3. A universal junction box for housing electrical apparatus having depressible start and reset buttons comprising a container having a threaded opening through its top, the opening being large enough for the passage of the electrical equipment, an operating member movably mounted by the container for depressing the reset button, and a cover for closing the opening, the cover having a pair of depressible rods, one for depressing the start button and the other for moving the operating member.

4. The junction box of claim 3 wherein the equipment has a plurality of reset buttons, means supported by the operator member for depressing the plurality of reset buttons when the operator member is moved, and means supported by the operator member for depressing the operator member when one of the rods is depressed.

5. The junction box of claim 4 wherein the first mentioned means comprises levers adjustably supported by the operator member.

6. The combination of claim 1 wherein the member has at least one flat side and the levers have portions bearing against the flat side to prevent pivoting of the levers about the member.

7. The combination of claim 1 wherein the levers have portions bearing against the side of the member nearest the operator buttons for absorbing the thrust forces of the levers when the member is pivoted.

8. The combination of claim 1 wherein the levers are slideable on the member to accommodate different positions of operator buttons corresponding to different electrical equipment that can be housed in the junction box.

9. A universal junction box for containing selective different kinds of electrical equipment comprising a housing having an open side, a plurality of covers adapted to close the open side, each cover having a plurality of depressible rods extending through it, the rods of different covers occupying different positions, the electrical equipment having a plurality of depressible operator buttons, the positions of which differ for different kinds of the electrical equipment, an operating member pivotally supported by the sides of the housing, at least one lever having releasable means for fastening the lever to the operating member whereby the lever can be moved to different positions each of which is opposite an operator button according to the kind of electrical equipment contained in the housing, one of the rods being adapted to pivot the operating member, at least one other rod being adapted to depress an operator button other than the operator button opposite the lever, the positions of the rods of the different covers being such that one rod is opposite the operating member and at least one rod corresponds to the position of a depressible operator button according to the kind of electrical equipment contained.

10. The junction box of claim 9 with closeable access means through the housing to provide access to wire terminals on the electrical equipment.

References Cited by the Examiner
UNITED STATES PATENTS

| | | | |
|---|---|---|---|
| 1,394,398 | 10/21 | Benjamin | 200—172 |
| 2,233,336 | 2/41 | Bentley | 200—168 |
| 2,872,536 | 2/59 | Honeywell | 200—153 |
| 3,011,017 | 11/61 | Oeler | 200—7 |

BERNARD A. GILHEANY, *Primary Examiner.*

MAX L. LEVY, E. JAMES SAX, ROBERT K. SCHAEFER, *Examiners.*